US009438159B2

(12) United States Patent
Schock et al.

(10) Patent No.: US 9,438,159 B2
(45) Date of Patent: Sep. 6, 2016

(54) SYSTEM AND METHOD FOR DETECTING AND CONTROLLING A MOTOR

(71) Applicant: Nidec Motor Corporation, St. Louis, MO (US)

(72) Inventors: Christopher D. Schock, O'Fallon, MO (US); Prakash B. Shahi, St. Louis, MO (US); Bret S. Clark, Oakville, MO (US); Michael I. Henderson, North Yorkshire (GB)

(73) Assignee: Nidec Motor Corporation, St. Louis, MO (US)

( * ) Notice: Subject to any disclaimer, the term of this patent is extended or adjusted under 35 U.S.C. 154(b) by 46 days.

(21) Appl. No.: 14/316,421

(22) Filed: Jun. 26, 2014

(65) Prior Publication Data

US 2015/0381093 A1  Dec. 31, 2015

(51) Int. Cl.
*G05B 5/00* (2006.01)
*H02H 7/08* (2006.01)
*H02P 23/00* (2016.01)
*H02P 27/06* (2006.01)

(52) U.S. Cl.
CPC ....... *H02P 23/0027* (2013.01); *H02P 23/0077* (2013.01); *H02P 27/06* (2013.01)

(58) Field of Classification Search
CPC ........... H02P 2207/05; H02P 23/0027; H02P 23/0077; H02P 25/08; H02P 27/06
USPC .................................................. 318/454, 479
See application file for complete search history.

(56) References Cited

U.S. PATENT DOCUMENTS

| 34,286 A | * | 2/1862 | Toyoshima et al. | ..... C22B 11/10 209/197 |
| 6,768,279 B1 | * | 7/2004 | Skinner | ................... H02P 6/001 318/400.12 |
| 6,810,292 B1 | * | 10/2004 | Rappenecker | ....... G05B 19/042 700/82 |
| 2007/0055607 A1 | * | 3/2007 | Wunsch | ................. G06Q 30/06 705/37 |
| 2009/0300270 A1 | * | 12/2009 | Shahi | ................. H02K 11/0078 711/103 |
| 2012/0013281 A1 | * | 1/2012 | Watanabe | ........... H02P 23/0027 318/400.04 |
| 2012/0032624 A1 | * | 2/2012 | Peterson | ............. H02P 23/0077 318/479 |

* cited by examiner

*Primary Examiner* — Bentsu Ro
*Assistant Examiner* — Zemenay Truneh
(74) *Attorney, Agent, or Firm* — Hovey Williams LLP

(57) ABSTRACT

A system including an electric motor and a control software operable to control the operation of a plurality of different types of electric motors. The control software is provided with or identifies a particular control algorithm from among a plurality of such algorithms and/or a particular set of operational parameters from among a plurality of such sets for the motor with which it is assembled. The sets of operational parameters are stored in one or more read-only memories, which may be electrically erasable programmable read-only memories. To identify the particular motor control algorithm and/or the particular set of operational parameters, the control software causes the motor to be energized, senses an actual operating parameter of the motor, and identifies the particular motor control algorithm and/or the particular set of operational parameters based on the sensed actual operating parameter.

16 Claims, 4 Drawing Sheets

SYSTEM AND METHOD FOR DETECTING AND CONTROLLING A MOTOR

FIELD

The present invention relates to systems and methods for controlling the operation of electric motors.

BACKGROUND

Electric motor control subsystems use control software to control the operation of motors. However, motors can have different winding designs and/or other characteristics that affect how the operation of those motors is controlled. Thus, specific control software and motor control algorithms must be used with specific types of motors having specific operational parameters. Creating and maintaining different versions of the control software can be inefficient. Furthermore, having different control software versions raises the possibility of assembling a motor with the wrong version of the control software using the wrong motor control algorithm using the wrong operational parameters.

This background discussion is intended to provide information related to the present invention which is not necessarily prior art.

SUMMARY

Embodiments of the present invention solve the above-described and other problems and limitations by using a single version of the control software that is provided with or determines the particular motor control algorithm and the particular set of operational parameters for the motor with which it is assembled and, based thereon, properly controls that motor, thereby eliminating the need to create and maintain different versions of the control software for different motors and the associated risk of assembling the wrong version with a particular motor.

In a first embodiment of the present invention, the electric motor system may broadly comprise an electric motor and a motor control subsystem in communication with the motor and operable to control its operation. The motor control subsystem may include a power inverter operable to provide power to the motor, a microprocessor in communication with the power inverter and operable to execute the control software, and first and second memories in communication with the microprocessor. The first memory may contain the control software and a particular motor control algorithm, wherein the control software is operable to control the operation of a plurality of different types of electric motors and uses the particular motor control algorithm to control operation of the electric motor. The second memory may contain a particular set of operational parameters, wherein the particular motor control algorithm uses the particular set of operational parameters to control operation of the electric motor. In operation, the control software identifies the particular set of operational parameters in the second memory and transfers the identified particular set of operational parameters from the second memory to the particular motor control algorithm for use in controlling operation of the electric motor.

In a second embodiment of the present invention, the first memory also contains a plurality of motor control algorithms, including the particular motor control algorithm for controlling the electric motor, and/or the one or more second memories contain a plurality of sets of operational parameters, including the particular set of operational parameters for controlling the electric motor. In operation, the control software identifies the particular motor control algorithm and/or the particular set of operational parameters and transfers the identified particular set of operational parameters from the one or more second memories to the identified particular motor control algorithm for use in controlling operation of the electric motor.

In various implementations of these embodiments, the electric motor control subsystem may further include any one or more of the following additional features. The electric motor may be an electric induction motor or a permanent magnet motor. The second memory may be a type of read-only memory, such as an electrically erasable programmable read-only memory. The control software may cause the power inverter to energize the electric motor, sense an actual operating parameter of the electric motor, and identify the particular motor control algorithm and/or the particular set of operational parameters based on the sensed actual operating parameter. The particular motor control algorithm and/or the particular set of operational parameters may be identified each time the electric motor is started or may be identified once and then remembered as being appropriate for the electric motor.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention uses a single version of control software that is provided with or determines the particular motor control algorithm and the particular set of operational parameters for the motor with which it is assembled and, based thereon, properly controls that motor, thereby eliminating the need to create and maintain different versions of the control software for different motors and the associated risk of assembling the wrong version with a particular motor.

Figure 1:
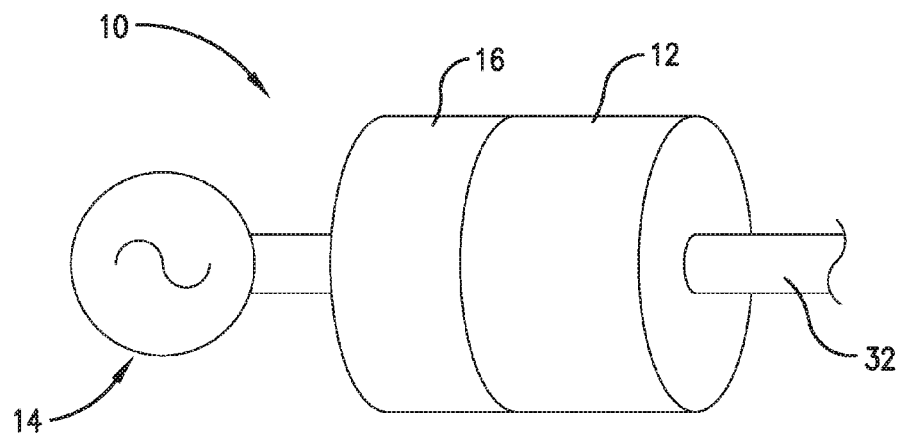
FIG. 1 is a schematic diagram of an electric motor system of the present invention.
Figure 2:
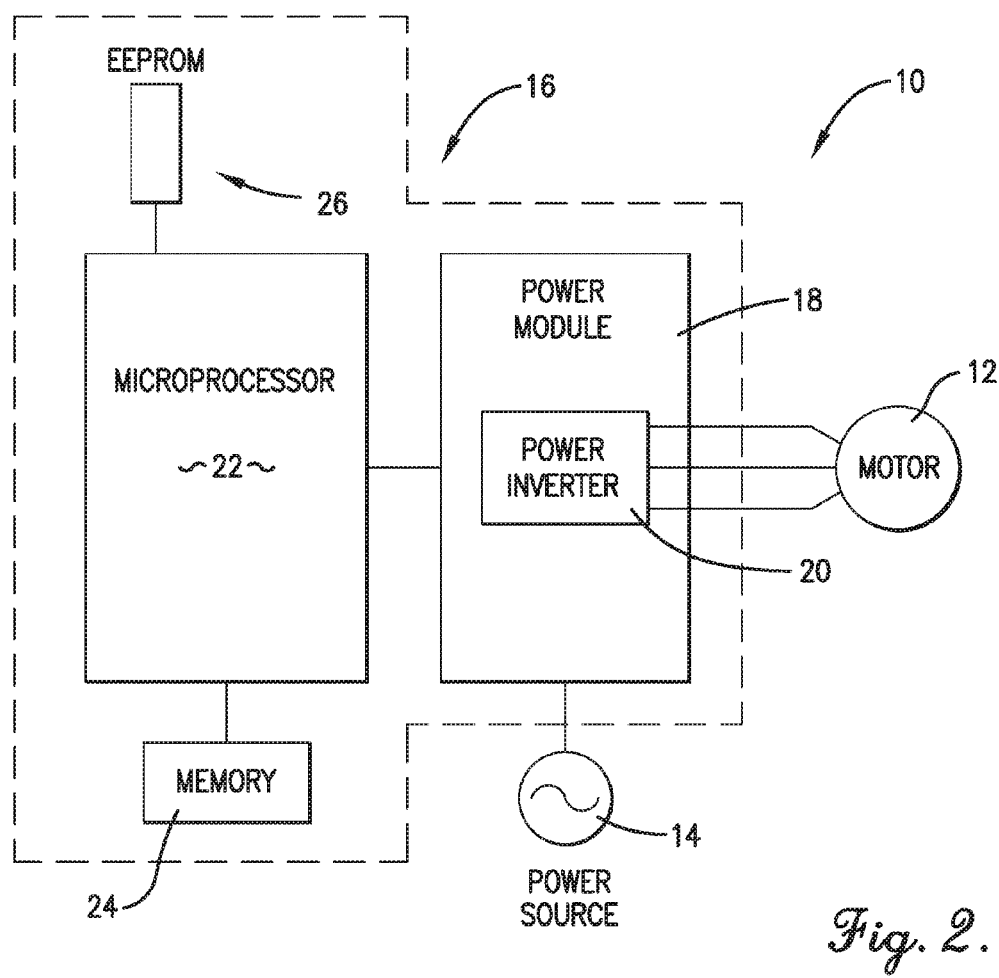
FIG. 2 is a block diagram of a first embodiment of the electric motor system.

Referring to the figures, an electric motor system 10 constructed in accordance with an embodiment of the present invention is shown. Referring to FIG. 1, the motor system 10 may broadly include an electric motor 12; a power source 14; and a motor control subsystem 16. Referring also to FIG. 2, the motor control subsystem 16 may include a power module 18; a power inverter 20; a microprocessor 22; a first memory 24; and a second memory 26. The motor system 10 may drive any appropriate load. For example, the motor system 10 may drive a fan or a pump which may be part of a heating and air-conditioning unit or an appliance, such as a washing machine or a clothes dryer, which may include additional electrical or mechanical components not described herein.

The electric motor 12 may be an electric induction motor or permanent magnet motor. For example, the motor 12 may be a three-phase, four-pole alternating current (AC) induction motor rated to operate at a maximum voltage of approximately between 190 Volts and 200 Volts and a maximum current of approximately between 4 Amps and 6 Amps. The motor 12 may include a rotor assembly with a shaft 32 which transmits the driving force to the load. The power source 14 may be a conventional AC power source, such as a standard 115 Volt or 230 Volt source available in residential and commercial buildings via standard electrical outlets.

The motor control subsystem 16 may be broadly operable to control operation of the motor 12. The power module 18 may be operable to receive power from the power source 14 and generate a driving waveform to power the motor 12. The power inverter 20 may be operable to convert one form of power to another (e.g., direct current (DC) to AC) at a required frequency and amplitude to power the motor 12. To that end, the power inverter 20 may include three half-bridge converters, with each converter including two transistors that are alternately turned on and off to produce three voltage signals, each 120 degrees apart in phase, to power the three-phase motor 12.

The microprocessor 22 may be operable to process digital signals used to control operation of the motor 12, including signals that enable the operation of and otherwise control operation of the power module 18. The microprocessor 22 may also be operable to receive and process signals from other components of the motor system 10, including the power module 18, and, to that end, the microprocessor 22 may be in bi-directional communication with the power module 18. The microprocessor 22 may also be operable to execute one or more computer programs, including the control software and a motor control algorithm, each comprising a set of executable instructions to accomplish certain signal processing and other functionality.

The first memory 24 may be internal to, external to, or otherwise accessible by the microprocessor 22, and operable to store some or all of the computer programs, including the control software and the motor control algorithm, and other information. The first memory 24 may be of any suitable non-volatile type of memory, such as the various types of read-only (ROM), flash, magnetic, or optical memories.

The second memory 26 may be internal to, external to, or otherwise accessible by the microprocessor 22, and operable to store at least the particular set of operational parameters for the motor 12. The second memory 26 may be any suitable non-volatile type of memory, such as the various types of read-only (ROM), flash, magnetic, or optical memories. In one implementation, the second memory 26 may be one (shown in FIG. 2) or more (shown in FIG. 4) electrically erasable programmable read-only memories (EEPROMs).

Thus, the control software, which is stored in the first memory 24 and executed by the microprocessor 22, is operable to control a plurality of different types of electric motors (having, e.g., different winding designs). The control software makes use of the motor control algorithm, which may also be stored in the first memory 24 and executed by the microprocessor 22, which is appropriate for the particular type of the motor 12. In turn, the motor control algorithm uses the set of operational parameters, which is stored in the second memory 26, which is also appropriate for the particular type of the motor 12.

Figure 3:
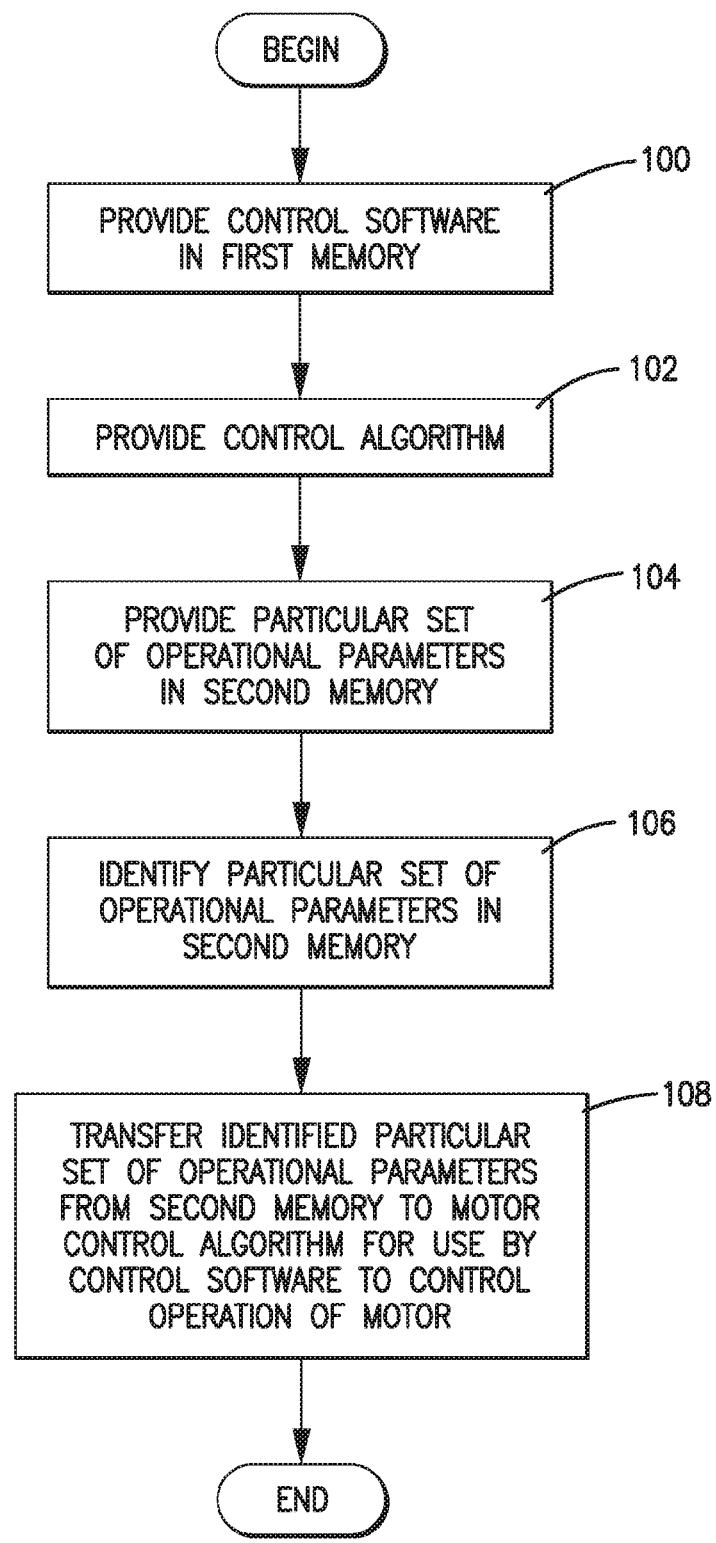
FIG. 3 is a flow diagram of steps involved in the operation of the electric motor system of FIG. 2.

In operation, the motor system 10 may operate as follows. Referring to FIGS. 2 and 3, in a first embodiment of the present invention, the control software is provided in the first memory 24, as shown in step 100; the motor control algorithm is provided, as shown in step 102; and the particular set of operational parameters for the particular type of the motor 12 is provided in the second memory, as shown in step 104. The particular set of operational parameters is identified, as shown in step 106. The particular set of operational parameters may be identified by being the only set of operational parameters stored in the second memory 26, or may be flagged or otherwise identified among a plurality of sets of operational parameters stored on the second memory 26. The particular set of operational parameters may be identified each time the motor 12 is started, or may be identified once and then remembered as being appropriate for the motor 12. The particular set of operational parameters is transferred to the motor control algorithm, and the motor control algorithm is used by the control software to control operation of the motor 12, as shown in step 108.

Figure 4:
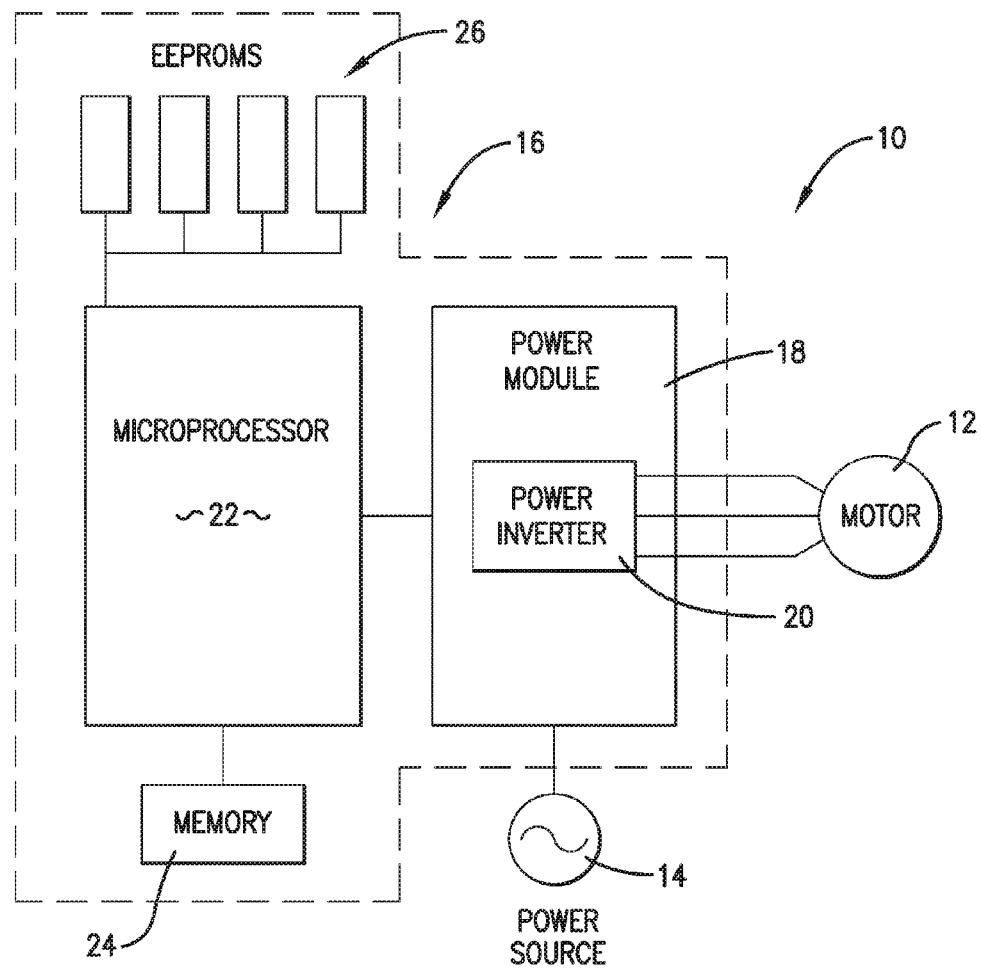
FIG. 4 is a block diagram of a second embodiment of the electric motor system.
Figure 5:
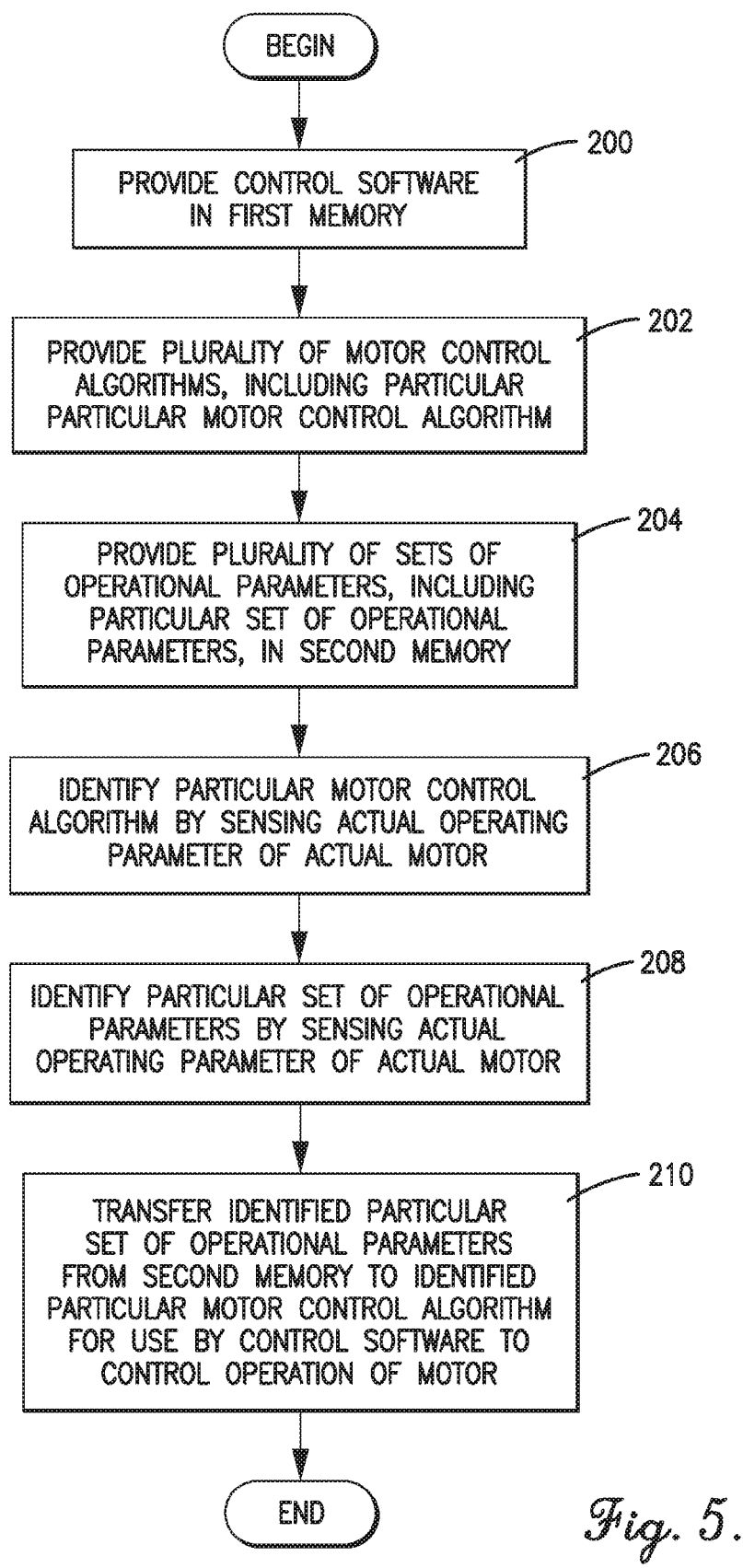
FIG. 5 is a flow diagram of steps involved in the operation of the electric motor system of FIG. 4.

Referring to FIGS. 4 and 5, in a second embodiment of the present invention, the control software is provided in the first memory 24, as shown in step 200; a plurality of motor control algorithms for different types of motors is provided, as shown in step 202; and a plurality of sets of operational parameters for different types of motors is provided in the one or more second memories 26, as shown in step 204. The particular motor control algorithm which is appropriate to the type of the motor 12 is identified from among the plurality of sets of motor control algorithms, as shown in step 206. The particular set of operational parameter which is appropriate to the type of the motor 12 is identified from among the plurality of sets of operational parameters, as shown in step 208. The particular motor control algorithm and/or the particular set of operational parameters may be identified by the control software, such as by one or more identification algorithms within the control software, that senses one or more actual operating parameters of the motor 12, and, based thereon, determines the particular motor control algorithm and/or the particular set of operational parameter that are appropriate to the type of the motor 12.

Sensing the one or more actual operating parameters of the actual motor 12 may require that the motor control subsystem 16 energize the motor 12, though it may not require that the motor control subsystem 16 actually start the motor 12. For example, the identification algorithm may cause the power inverter 20 to energize the motor 12 with some voltage and frequency, and then estimate one or more of the energized motor's actual operating parameters, such as resistance or inductance, based on sensed feedback. The particular motor control algorithm and/or the particular set of operational parameters may be identified each time the motor 12 is started, or may be identified once and then remembered as being appropriate for the motor 12. The identified particular set of operational parameters is then transferred to the identified particular motor control algorithm, and the identified particular motor control algorithm is used by the control software to control operation of the motor 12, as shown in step 210.

The present invention provides advantages over the prior art, including that it uses a single version of control software that is provided with or determines the particular motor control algorithm and the particular set of operational parameters for the motor with which it is assembled and, based thereon, properly controls that motor, thereby eliminating the need to create and maintain different versions of control software for different motors and the associated risk of assembling the wrong version with a particular motor.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An electric motor system comprising:
  an electric motor; and
  a motor control subsystem in communication with the electric motor and configured to control operation of the electric motor, the motor control subsystem including
    a power inverter configured to provide power to the electric motor,
    a microprocessor in communication with the power inverter, and configured to execute a control software,
    a first memory in communication with the microprocessor and containing the control software and a plurality of motor control algorithms, including a particular motor control algorithm which is appropriate for the electric motor, wherein the control software is configured to control the operation of a plurality of different types of electric motors and to identify the particular motor control algorithm from among the plurality of motor control algorithms and to use the particular motor control algorithm to control operation of the electric motor, wherein the particular motor control algorithm is identified once and then remembered by the motor control subsystem as being appropriate for the electric motor, and
    a second memory in communication with the microprocessor and containing a particular set operational parameters, wherein the particular motor control algorithm uses the particular set of operational parameters to control operation of the electric motor, wherein the control software identifies the particular set of operational parameters in the second memory and transfers the identified particular set of operational parameters from the second memory to the particular motor control algorithm for use in controlling operation of the electric motor.

2. The system as set forth in claim 1, wherein the electric motor is an electric induction motor or a permanent magnet motor.

3. The system as set forth in claim 1, wherein the control software causes the power inverter to energize the electric motor, senses an actual operating parameter of the electric motor, and identifies the particular motor control algorithm based on the sensed actual operating parameter.

4. The system as set forth in claim 1, wherein the second memory contains a plurality of sets of operational parameters, including the particular set of operational parameters, and the control software identifies the particular set of operational parameters from among the plurality of sets of operational parameters.

5. The system as set forth in claim 4, wherein the control software causes the power inverter to energize the electric motor, senses an actual operating parameter of the electric motor, and identities the particular set of operational parameters based on the sensed actual operating parameter.

6. A method of controlling an electric motor in an electric motor system having a motor control subsystem, the motor control subsystem including a first memory and a second memory, the method comprising the steps of:
  (1) providing in the first memory a control software configured to control a plurality of different types of electric motors including the electric motor;
  (2) providing a plurality of motor control algorithms, including a particular motor control algorithm which is appropriate for controlling the type of the electric motor, and identifying the particular motor control algorithm from among the plurality of motor control algorithms, wherein the particular motor control algorithm is identified once and then remembered by the motor con roll subsystem system as being appropriate for the electric motor;
  (3) providing in the second memory a particular set of operational parameters for the electric motor;
  (4) identifying the particular set of operational parameters; and
  (5) transferring the identified particular set of operational parameters from the second memory to the particular motor control algorithm for use by the control software in controlling the electric motor.

7. The method as set forth in claim 6, wherein the electric motor is an electric induction motor or is permanent magnet motor.

8. The method as set forth in claim 6, wherein step (4) includes energizing the electric motor, sensing an actual operating parameter of the energized electric motor, and identifying the particular motor control algorithm based on the sensed actual operating parameter.

9. The method as set forth in claim 6, wherein step (3) includes providing a plurality of sets of operational parameters, including the particular set of operational parameters, in the second memory.

10. The method as set forth in claim 9, wherein step (4) includes energizing the electric motor, sensing an actual operating parameter of the energized electric motor, and identifying the particular set of operational parameters based on the sensed actual operating parameter.

11. An electric motor system comprising:
an electric motor; and
a motor control subsystem in communication with the electric motor and configured to control operation of the electric motor, the motor control subsystem including
  a power inverter configured to provide power to the electric motor,
  a microprocessor in communication with the power inverter, and configured to execute a control software,
  a first memory in communication with the microprocessor and containing the control software and a plurality of motor control algorithms, including a particular motor control algorithm which is appropriate for the electric motor, wherein the control software is configured to control the operation of a plurality of different types of electric motors and to identify the particular motor control algorithm from among the plurality of motor control algorithms and to use the particular motor control algorithm to control operation of the electric motor, wherein the particular motor control algorithm is identified each time the electric motor is started, and
  a second memory in communication with the microprocessor and containing a particular set of operational parameters, wherein the particular motor control algorithm uses the particular set of operational parameters to control operation of the electric motor, wherein the control software identifies the particular set of operational parameters in the second memory and transfers the identified particular set of operational parameters from the second memory to the particular motor control algorithm for use in controlling operation of the electric motor.

12. A method of controlling an electric motor in an electric motor system having a motor control subsystem, the motor control subsystem including a first memory and a second memory, the method comprising the steps of:
  (1) providing in the first memory a control software configured to control a plurality of different types of electric motors including the electric motor;
  (2) providing a plurality of motor control algorithms, including a particular motor control algorithm which is appropriate for controlling the type of the electric motor, and identifying the particular motor control algorithm from among the plurality of motor control algorithms, wherein the particular motor control algorithm is identified each time the electric motor is started;
  (3) providing in the second memory a particular set of operational parameters for the electric motor;
  (4) identifying the particular set of operational parameters; and
  (5) transferring the identified particular set of operational parameters from the second memory to the particular motor control algorithm for use by the control software in controlling the electric motor.

13. An electric motor system comprising:
an electric motor; and
a motor control subsystem in communication with the electric motor and configured to control operation of the electric motor, the motor control subsystem including
  a power inverter configured to provide power to the electric motor,
  a microprocessor in communication with the power inverter, and configured to execute a control software,
  a first memory in communication with the microprocessor and containing the control software and a particular motor control algorithm which is appropriate for the electric motor, wherein the control software is configured to control the operation of a plurality of different types of electric motors and uses the particular motor control algorithm to control operation of the electric motor, and
  a second memory in communication with the microprocessor and containing a particular set of operational parameters, wherein the particular motor control algorithm uses the particular set of operational parameters to control operation of the electric motor, wherein the control software identifies the particular set of operational parameters in the second memory and transfers the identified particular set of operational parameters from the second memory to the particular motor control algorithm for use in controlling operation of the electric motor, wherein the particular set of operational parameters is identified each time the electric motor is started.

14. A method of controlling an electric motor in an electric motor system having a motor control subsystem, the motor control subsystem including a first memory and a second memory, the method comprising the steps of:
  (1) providing in the first memory a control software configured to control a plurality of different types of electric motors including the electric motor;
  (2) providing a particular motor control algorithm which is appropriate for controlling the type of the electric motor;
  (3) providing in the second memory a particular set of operational parameters for the electric motor;
  (4) identifying the particular set of operational parameters, wherein the particular set of operational parameters is identified each time the electric motor is started; and
  (5) transferring the identified particular set of operational parameters from the second memory to the particular motor control algorithm for use by the control software in controlling the electric motor.

15. An electric motor system comprising:
an electric motor; and
a motor control subsystem in communication with the electric motor and configured to control operation of the electric motor, the motor control subsystem including
  a power inverter configured to provide power to the electric motor,
  a microprocessor in communication with the power inverter, and configured to execute a control software,
  a first memory in communication with the microprocessor and containing the control software and a particular motor control algorithm which is appropriate for the electric motor, wherein the control software is configured to control the operation of a plurality of different types of electric motors and uses the particular motor control algorithm to control operation of the electric motor, and
  a second memory in communication with the microprocessor and containing a particular set of operational parameters, wherein the particular motor control algorithm uses the particular set of operational parameters to control operation of the electric motor, wherein the control software identifies the particular set of operational parameters in the second memory and transfers the identified particular set of operational parameters from the second memory to the particular motor control algorithm for use in controlling operation of the electric motor, wherein the particular set of operational parameters is identified once and then remembered by the motor control subsystem.

16. A method of controlling an electric motor in an electric motor system having a motor control subsystem, the motor control subsystem including a first memory and a second memory, the method comprising the steps of:
  (1) providing in the first memory a control software configured to control a plurality of different types of electric motors including the electric motor;
  (2) providing a particular motor control algorithm which is appropriate for controlling the type of the electric motor;
  (3) providing in the second memory a particular set of operational parameters for the electric motor;
  (4) identifying the particular set of operational parameters, wherein the particular set of operational parameters is identified once and then remembered by the motor control subsystem; and
  (5) transferring the identified particular set of operational parameters from the second memory to the particular motor control algorithm for use by the control software in controlling the electric motor.

* * * * *